UNITED STATES PATENT OFFICE.

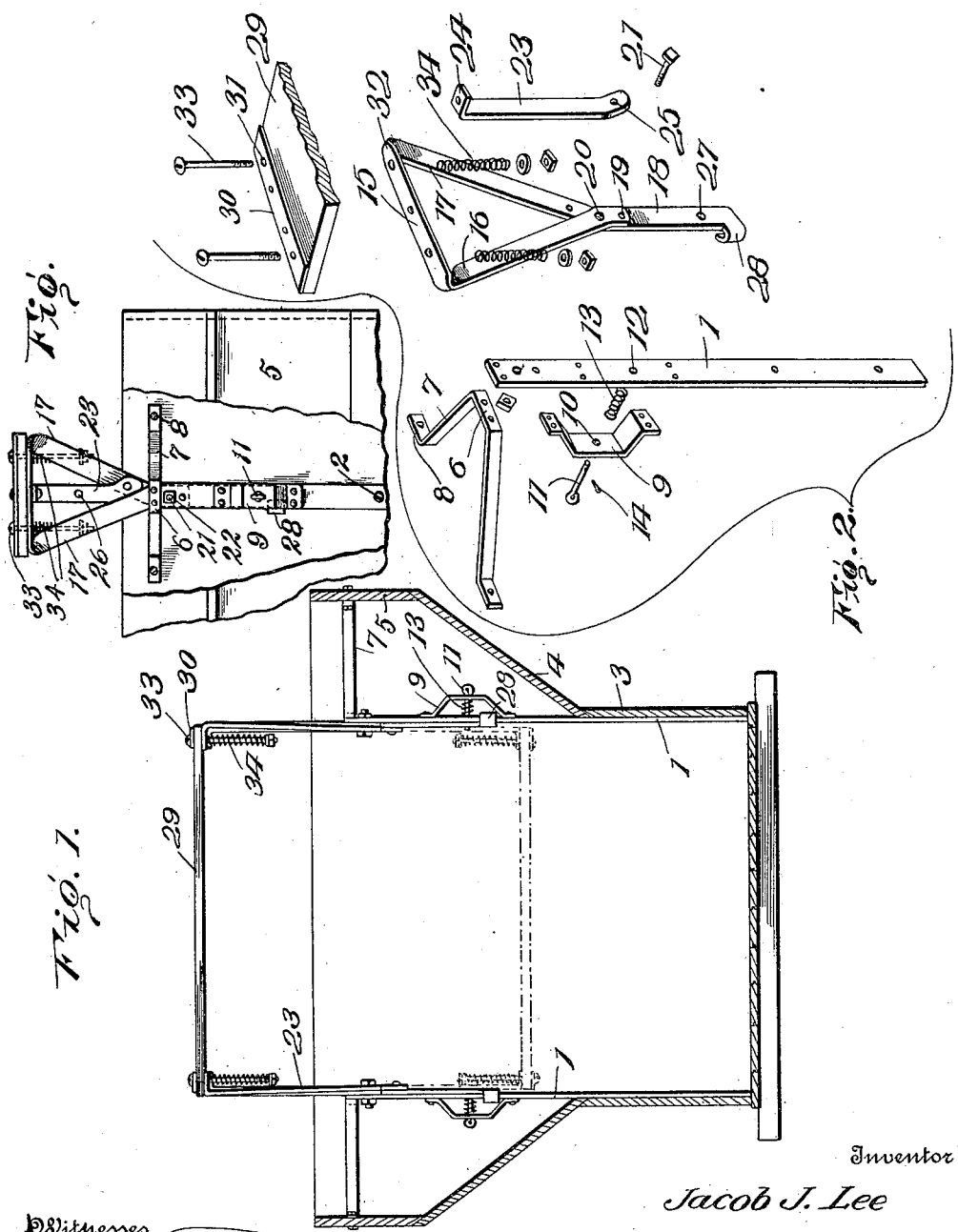

JACOB J. LEE, OF AGATE, NORTH DAKOTA.

SEAT FOR GRAIN-WAGONS.

1,136,685. Specification of Letters Patent. Patented Apr. 20, 1915.

Application filed May 6, 1913. Serial No. 765,858.

*To all whom it may concern:*

Be it known that I, JACOB J. LEE, citizen of the United States, residing at Agate, in the county of Rolette and State of North Dakota, have invented certain new and useful Improvements in Seats for Grain-Wagons, of which the following is a specification.

This invention relates to seats for grain wagons or, as they are commonly called, grain tanks, and has as its object to provide a seat which may be comfortably occupied whether the wagon be loaded or emptied.

Ordinarily, a seat-board is disposed upon the top of the wagon, but the driver who occupies such a seat has no rest for his feet, and in fact the drivers of such wagons usually find it preferable to stand in the body of the wagon. In neither event, however, can the driver wrap himself in robes or blankets to protect him from the cold.

The present invention, therefore, has as its primary aim to provide a seat and a support therefor so constructed that the seat may be supported in elevated position when the wagon is being driven loaded and may be supported a suitable distance above the floor of the wagon body when the wagon is empty, in the first instance to permit of the driver resting his feet upon the top of the front of the wagon body and in the second instance to permit of him resting his feet upon the floor of the wagon body.

It is a well-known fact that when a wagon is being driven loaded it will travel more steadily and with less vibration than when empty, and the invention therefore aims to so construct the support for the seat-board that while the board will be rigidly supported when elevated, it will be yieldably supported when lowered, so that in the latter instance it may be occupied with practically the same degree of comfort as a spring-seat.

The invention further aims to provide a seat of the class mentioned which may be readily applied to wagon bodies of various dimensions with only the substitution of a seat-board of one length for another of a different length.

For a full understanding of the invention reference is to be had to the following description and accompanying drawings, in which:—

Figure 1 is a view in front elevation of the seat structure embodying the present invention arranged within a grain wagon body which is shown in transverse section. Fig. 2 is a group perspective view illustrating certain of the parts of the structure in position to be assembled. Fig. 3 is a side elevation, illustrating the parts shown in Fig. 2 assembled.

Corresponding and like parts are referred to in the following description and indicated in all the views of the accompanying drawings by the same reference characters.

In the drawings the seat-board is illustrated as supported by hanger members which are mounted upon standards at opposite sides of the wagon body.

The standards mentioned above are indicated by the numeral 1 and each consists of a suitable length of bar metal bolted or otherwise secured as at 2 to one side wall of the body which is indicated at 3. The sides of the body 3 are, as usual, inclined upwardly as at 4 from their lower portions and from their inclined portions extend vertically as at 5. The standards 1 at their upper ends are braced in spaced relation to the portions 5 of the sides of the body by means of suitable brackets each formed from a length of bar metal bent to provide a connecting portion 6 and arms 7 which terminate in attaching ears 8 secured to the said portions 5. The intermediate portion 6 of each bracket is riveted or otherwise secured to the upper end of the respective standard 1.

For a purpose to be presently explained a spring-pressed latch-pin is provided upon each of the standards 1 and each of these pins is mounted in a suitable bracket bearing 9 riveted or otherwise secured to the respective standard and formed in its intermediate portion with an opening 10 slidably receiving the pin which is indicated at 11. The pin also fits slidably through an opening 12 formed in the respective standard 1 and upon each pin is fitted a spring 13 bearing at one end against the said intermediate portion of the bracket bearing 9 and bearing at its other end against a stop-pin 14 fitted transversely through the pin 11.

Each of the seat-board supporting hangers is formed in part from a single length of bar metal which at spaced points is twisted and bent so as to form laterally projecting attaching plate-portions 15 and downwardly converging arms 16 and 17. The arm 17 is of greater length than the arm 16 and has its lower portion bent at an angle so as to form a vertically extending portion 18. The lower end of the arm 16 is riveted or otherwise secured as at 19 to the arm 17 at its bend which forms the portion 18, and said end of the arm 16 and said portion of the arm 17 are formed with registering openings 20 through which is fitted a pivot-bolt 21 passed also through the upper end of the respective standard 1, and secured by a nut 22. A bar 23 is bent at its upper end as at 24 to form an attaching portion secured to the attaching plate portion 15 and at its lower end this bar is riveted as at 25 to the arm 17. For a purpose to be presently set forth the arm 23 is provided with an opening 26 and the portion 18 of the arm 17 is provided with an opening 27, the openings 26 and 27 being equi-distantly spaced from the pivot 20. By reference to Fig. 2 of the drawing it will be observed that the lower end of the portion 18 of the arm 17 is bent laterally and upon itself as at 28.

The seat-board is indicated by the numeral 29 and has secured to it at each end a metallic reinforcing strip 30 having openings 31 registering with openings in the seat-board which in turn register with openings 32 formed in the attaching portion 15 of the respective seat-board hanger. Bolts 33 are fitted through the openings 31 and 32 and arranged upon each of the bolts is a spring 34 bearing at one end against the portion 15 of the hanger and at its other end against a washer and nut 35 threaded upon the bolt.

From the foregoing description of the invention it will be seen that when the wagon is loaded and it is desired to support the seat-board in elevated position, the hanger members are so swung that the openings 27 therein will come opposite the openings 12 in the respective standards 1, whereupon the latch-pins 11 will be held projected by their respective springs 13 into the said openings 27. When the hangers are in the position stated the hooked lower ends 28 of their portions 18 will engage over the respective standards 1 and the seat will be firmly braced in the position shown in full lines, in Fig. 1 of the drawings. When the wagon is being drawn empty, however, and it is desired to provide a cushion-seat and to locate the seat near the floor of the wagon, the latch-pins 11 are withdrawn from engagement in the openings 27 and the seat-board and its supporting hangers are swung downwardly until the openings 26 in the members 23 come opposite the openings 12 in the respective standards 1. The latch-pins 11 are then allowed to resume their normal position and the seat-board will be supported at shown in dotted lines in the said Fig. 1. It will be noted that when in this latter position the seat-board may yield downwardly against the tension of the springs 34 and consequently the seat is rendered practically as comfortable as an ordinary spring-seat.

Having thus described the invention what is claimed as new is:—

1. In a seat structure, standards, a seat board hanger pivotally mounted upon each of the standards, the hangers being supported for reversal, a seat board supported by the hangers and arranged when the hangers are in one position to lie above the pivots for the hangers and when the hangers are in the reverse position to lie below the said pivots, and a hook carried by each hanger and arranged to engage with the respective standard when the hangers are in the first mentioned position, whereby to brace the same against tilting.

2. In a seat structure, standards, a seat-board hanger pivotally mounted upon each of the standards, each of the hangers having portions extending at opposite sides beyond the pivot, a seat-board supported by one of the portions of each of the hangers and arranged when the hangers are in one position of adjustment to assume a position above the pivot and when the hangers are in another position of adjustment to assume a position below the pivot, and means coöperating with the said portions of each hanger for holding the hangers in either of their positions of adjustment.

3. In a seat structure, standards, a seat-board hanger pivotally mounted upon each of the standards, each of the hangers having portions extending at opposite sides beyond the pivot, a seat-board supported by one of the portions of each of the hangers and arranged when the hangers are in one position of adjustment to assume a position above the pivot and when the hangers are in another position of adjustment to assume a position below the pivot, means coöperating with the said portions of each hanger for holding the hangers in either of their positions of adjustment, and means yieldably supporting the seat-board when the hangers are in their last mentioned adjusted position.

4. In a seat structure, standards, seat board hangers mounted upon the standards for reversal and each provided with a seat board supporting flange, the said flanges being provided with openings, a seat board disposed to rest against the flanges, bolts secured through the seat board and slidably fitting in the said openings in the flanges, a spring upon each of the bolts, and a stop upon each bolt the springs bearing at their ends against the stops and the said flanges.

5. In a seat structure, standards, a seat board hanger pivotally mounted upon each of the standards, each of the hangers having portions extending at opposite sides beyond the pivot, a seat board supported at each end by one of the portions of each hanger and arranged when the hangers are in one position of adjustment to assume a position above the pivot and when the hangers are in another position of adjustment to assume a position below the pivot, each of the hangers having each of its portions provided with a keeper member and the said keeper members of each hanger being equi-distantly spaced at opposite sides of the pivot, and a latch member carried by each hanger and co-operating with the keeper members, whereby to support the hangers in one or another of their said positions of adjustment.

In testimony whereof I affix my signature in presence of two witnesses.

JACOB J. LEE. [L. S.]

Witnesses:
C. F. NELSON,
W. I. NOYES.

Copies of this patent may be obtained for five cents each, by addressing the "Commissioner of Patents, Washington, D. C."